UNITED STATES PATENT OFFICE.

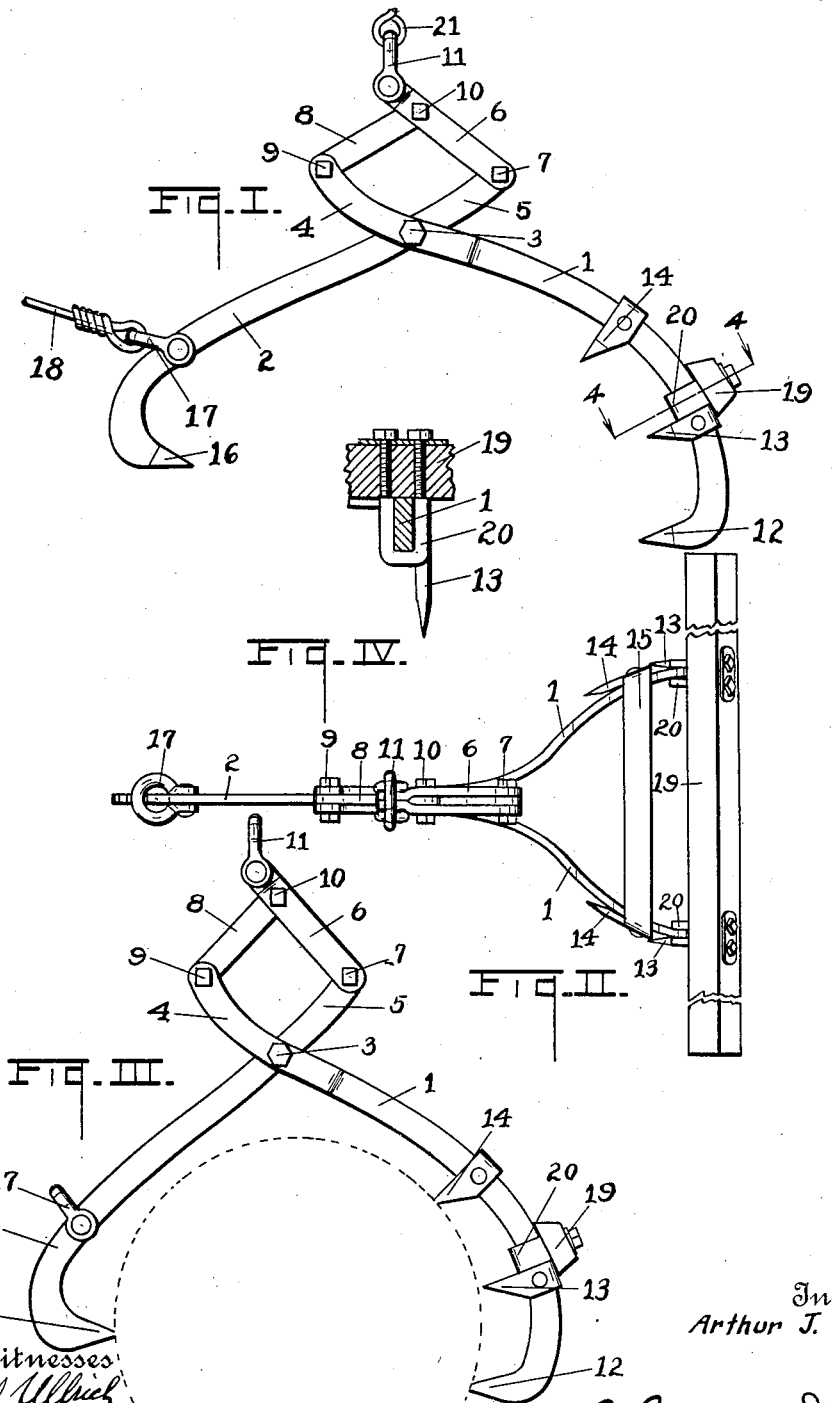

ARTHUR J. ZIPP, OF CHARLEVOIX, MICHIGAN.

LOGGING GRAPPLES OR TONGS.

1,340,313.  Specification of Letters Patent.  Patented May 18, 1920.

Application filed December 26, 1919. Serial No. 347,496.

*To all whom it may concern:*

Be it known that I, ARTHUR J. ZIPP, a citizen of the United States, residing at Charlevoix, county of Charlevoix, State of Michigan, have invented certain new and useful Improvements in Logging Grapples or Tongs, of which the following is a specification.

This invention relates to improvements in logging grapples or tongs.

The main objects of this invention are:

First, to provide an improved logging grapple effective for recovering submerged logs and logs embedded in the bottoms of lakes and rivers.

Second, to provide an improved logging grapple or tongs which is effective for grappling and hoisting logs of various diameters.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side view of my improved logging grapple or tongs, partially open.

Fig. II is a plan view thereof, the bar for maintaining the grapple in an upright position being partially broken away.

Fig. III is a side elevation showing my improved grapple engaged by a log, the log being indicated by dotted lines.

Fig. IV is a detail section on a line corresponding to line 4—4 of Fig. I.

In the drawing similar reference characters refer to similar parts throughout the several views.

Referring to the drawing, I provide a pair of downwardly diverging rear grapple members 1 and a coacting front grapple member 2, the front and rear grapple members being crossed and connected by the pivot 3 providing upwardly projecting actuating arms 4 and 5.

The link 6 is pivotally connected to the arm 5 at 7 while the link 8 is pivotally connected to the arm 4 at 9. The links are connected at 10, a hoisting cable connection 11 being provided at the end of the link 6.

The rear grapples have forwardly projecting prongs 12 at their lower ends and additional prongs 13 and 14 mounted thereon. These prongs 13 and 14 are connected by cross bars 15 which serve as a bracing means for the rear grapple members.

The front grapple member has a rearwardly projecting prong 16 at its lower end and is provided with a draft connection 17 to which the draft cable 18 is connected, so that the grapple members are held open by the cable and drawn along the bed of the lake or river.

A bar 19 is mounted upon the rear grapple members in a substantially spaced relation to their lower ends so that the lower ends of the gripping members may enter and drag along in the bottom of the lake, the bar 19 keeping the grapple in an upright position and serving as a shoe therefor. The bar 19 is secured by means of U bolts 20 which permits adjustment of the bar upon the grapple members.

With this arrangement of parts, the grapple may be drawn along the bed of a lake with the rear grapple members dragging in the bed to engage submerged logs. When a log is engaged, the pull on the draft cable is released and a pull on the hoisting cable 21 closes the grapple members upon the log and continued pull will raise the log.

The prongs 13 and 14 are disposed to engage the log preventing its rolling and slipping from the grapple and also providing means for gripping small logs which might not be effectively gripped or engaged by the prongs at the lower ends of the grapple members.

The arrangement of the drag bar 19 permits the effective engagement of embedded logs.

I have not attempted to illustrate or describe certain modifications or adaptations which might be desirable for certain conditions as I believe the disclosure made will enable those skilled in the art to which my invention relates to embody or adapt the same as may be desired.

Having thus described my invention, what I claim as new and desire to secure by Letters Patent, is:

1. In a structure of the class described, the combination of a pair of downwardly diverging rear grapple members provided with forwardly projecting prongs at their lower ends and having a plurality of forwardly projecting engaging prongs thereon above said lower prong, a front grapple member having a rearwardly projecting prong at its lower end, said front and rear grapple members being crossed and pivotally connected to provide upwardly projecting arms, links pivoted to said upwardly projecting arms of said grapple members and to each other, a hoisting cable connected to one of said links, a draft cable connected to the front grapple member, and a bar mounted upon the rear grapple members in a substantially spaced relation to their lower ends and projecting at each side thereof for supporting the grapple in an upright position.

2. In a structure of the class described, the combination of a pair of downwardly diverging rear grapple members, a front grapple member, said front and rear grapple members being crossed and pivotally connected to provide upwardly projecting arms, links pivoted to said upwardly projecting arms of said grapple members and to each other, a hoisting cable connected to one of said links, a draft cable connected to the front grapple member, and a bar mounted upon the rear grapple members in a substantially spaced relation to their lower ends and projecting at each side thereof for supporting the grapple in an upright position.

3. In a structure of the class described, the combination of a pair of downwardly diverging rear grapple members provided with forwardly projecting prongs at their lower ends and having a plurality of forwardly projecting engaging prongs thereon above said lower prong, a front grapple member having a rearwardly projecting prong at its lower end, said front and rear grapple members being crossed and pivotally connected to provide upwardly projecting arms, links pivoted to said upwardly projecting arms of said grapple members and to each other, a hoisting cable connected to one of said links, and a draft cable connected to the front grapple member.

4. In a grapple, the combination of a pair of downwardly diverging rear grapple members provided with forwardly projecting prongs at their lower ends and having a plurality of forwardly projecting engaging prongs thereon above said lower prong, a front grapple member having a rearwardly projecting prong at its lower end, a bar mounted upon the rear grapple members in a substantially spaced relation to their lower ends and projecting at each side thereof for supporting the grapple in an upright position, a draft means connected to the front grapple member, and a hoisting means independent of said draft means adapted to close said grapple.

5. In a structure of the class described, the combination of a pair of downwardly diverging rear grapple members and a front grapple member pivotally connected thereto, a bar mounted upon the rear grapple members in a substantially spaced relation to their lower ends and projecting at each side thereof for supporting the grapple in an upright position, the rear grapple members being provided with a plurality of forwardly projecting prongs, drag means adapted to hold said grapple members in open position, and an independent hoisting means adapted to close said grapple members.

6. In a structure of the class described, the combination of a pair of downwardly diverging rear grapple members and a front grapple member pivotally connected thereto, a bar mounted upon the rear grapple members in a substantially spaced relation to their lower ends and projecting at each side thereof for supporting the grapple in an upright position, drag means adapted to hold said grapple members in open position, and an independent hoisting means adapted to close said grapple members.

7. In a structure of the class described, the combination of a pair of grapple members, draft means connected to one of the said grapple members whereby the grapple is held in open position, a bar mounted upon the other grapple member in a substantially spaced relation to its lower end for supporting the grapple in an upright position, and hoisting connections independent of said draft means for closing the tongs, coacting as specified.

8. In a structure of the class described, the combination of a pair of grapple members, draft means connected to one of the said grapple members whereby the grapple is held in open position, a bar mounted upon the other grapple member end for supporting the grapple in an upright position, and hoisting connections independent of said draft means for closing the tongs, coacting as specified.

In witness whereof I have hereunto set my hand and seal in the presence of two witnesses.

ARTHUR J. ZIPP. [L. S.]

Witnesses:
  A. L. FITCH,
  P. G. FITCH.